United States Patent
Venkatachari et al.

(10) Patent No.: US 7,349,814 B2
(45) Date of Patent: Mar. 25, 2008

(54) MEASUREMENT METHOD AND ARRANGEMENT

(75) Inventors: Srikanth Venkatachari, Bangalore (IN); Mikael Holmberg, Porvoo (FI); Asko Salminen, Espoo (FI)

(73) Assignee: ABB Oy,, Helsinki (FI)

( * ) Notice: Subject to any disclaimer, the term of this patent is extended or adjusted under 35 U.S.C. 154(b) by 0 days.

(21) Appl. No.: 10/590,883

(22) PCT Filed: Mar. 4, 2005

(86) PCT No.: PCT/FI2005/000134

§ 371 (c)(1),
(2), (4) Date: Aug. 28, 2006

(87) PCT Pub. No.: WO2005/085772

PCT Pub. Date: Sep. 15, 2005

(65) Prior Publication Data
US 2007/0185661 A1 Aug. 9, 2007

(30) Foreign Application Priority Data
Mar. 4, 2004 (FI) .................................. 20040351

(51) Int. Cl.
*G01F 1/00* (2006.01)
*G01F 23/00* (2006.01)
(52) U.S. Cl. .............................. 702/50; 702/45; 702/98
(58) Field of Classification Search ................... 702/45, 702/50, 55, 98, 100; 417/44.1, 44.2, 46
See application file for complete search history.

(56) References Cited

U.S. PATENT DOCUMENTS

| | | | |
|---|---|---|---|
| 4,108,574 A | 8/1978 | Bartley et al. | |
| 4,781,525 A | 11/1988 | Hubbard et al. | |
| 5,318,409 A | 6/1994 | London | |
| 6,663,349 B1 * | 12/2003 | Discenzo et al. | 417/44.1 |
| 2004/0261407 A1 * | 12/2004 | Du | 60/448 |

FOREIGN PATENT DOCUMENTS

| | | |
|---|---|---|
| EP | 0 674 154 | 9/1995 |
| GB | 2 313 197 | 11/1997 |
| WO | WO 03/031918 | 4/2003 |

\* cited by examiner

*Primary Examiner*—Bryan Bui
(74) *Attorney, Agent, or Firm*—Young & Thompson

(57) ABSTRACT

The invention relates to a method and an arrangement for measuring a liquid flow in connection with a pump system. The invention is preferably implemented in a pump system where the pump (240) is driven by an alternating-current motor (230), whose rotating speed is controlled by a control unit (220), such as a frequency converter, for instance. In accordance with the invention, the flow is determined without any direct flow measurement by utilizing characteristic data of the pump and parameters that can be easily and reliably measured. Such parameters comprise the rotation speed of the pump, the liquid pressure and/or the motor power. Both the motor power and the rotation speed can be measured i.a. at the frequency converter (220). In addition, the static liquid pressure can be measured by means of a straightforward and reliable pressure sensor (244, 245), which can be integrated in the pump system. In implementing the invention, two characteristic curves of the pump can be advantageously used; flow as a function of power and flow as a function of pressure. This achieves high accuracy of measurement both with low and high flow values.

23 Claims, 4 Drawing Sheets

MEASUREMENT METHOD AND ARRANGEMENT

BACKGROUND OF THE INVENTION

1. Field of the Invention

The invention relates to a method and arrangement for measuring a liquid flow in connection with a pump system. The invention is preferably applied to pump systems in which the pump is driven by an alternating-current motor, whose rotation speed is controlled by a control unit, such as e.g. a frequency converter.

2. Description of the Related Art

Pump systems are used in the industries and in public utility services, among other things. In industrial applications, pump systems are in most cases used in connection with production processes, while they relate to transfer of pure water, rain water and waste water in municipal engineering. In conjunction with pump systems, it is often necessary to know the momentary liquid flow and the liquid amount transferred over a given period. Flow data are needed for several purposes. Flow data allow supervision of the condition and operation of the pump and of the functionality of the liquid transfer system. Flow data allow detection and localisation of e.g. leaks and obstructions in the piping or pumps of the liquid transfer system. Flow data are also useful in the billing of liquid transfer. In production processes, flow data are needed for controlling and monitoring the process.

Pump systems used for liquid transfer usually consist of one or more electrically driven pumps. The electric drive consists of a suitable power supply circuit, an electric motor and a control unit suitable for controlling and/or adjusting this. The pump operates as a load on the electric drive. The most frequently used electric motor in pump systems is an alternating-current motor, especially a induction motor. The control unit used in an alternating current motor often consists of a frequency converter because of the benefits gained by this. The speed of the electric motor is adjusted by the frequency converter, which converts the frequency of the voltage supplied to the motor. The frequency converter, again, is adjusted by appropriate electric control signals.

Figure 1:
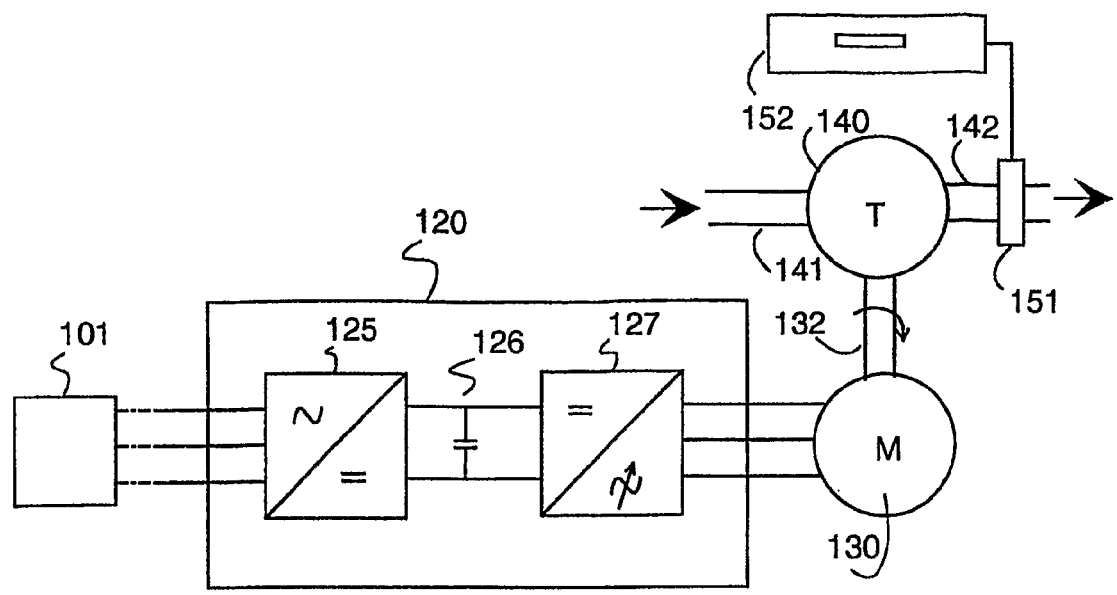

A prior art pump system is illustrated in FIG. 1. The pump 140 is actuated by an electric drive consisting of a power supply 101, a frequency converter 120 acting as the control unit and alternating-current motor 130, which in this case if a three-phase current motor. The motor is usually connected to the pump with the rotation speed of the motor and the rotation speed of the pump being identical. The power supply 101 comprises an alternating-current network, such as a three-phase network, or the like, for supplying electric power from the alternating-current source to the electric drive. The liquid flow through the pump is measured in the system of FIG. 1 by means of a separate flow meter including a flow sensor 151 and a measurement unit 152 equipped with a display.

The flow sensor may be e.g. an ultrasonic sensor or a mechanical flow sensor. However, a "pressure-difference sensor" is used in most cases, this sensor measuring the pressure difference generated by the flow in the flow direction and in the direction opposite to the flow. The flow Q can then be determined by the following formula:

$$Q = k * \sqrt{\Delta p} \qquad (1)$$

in which k is the constant determined by the flow path between the pressure sensors and $\Delta p$ is the measured pressure difference.

However, the use of a separate flow meter involves a number of drawbacks. Very high precision is required from a sensor for determining pressure difference in order to achieve such flow measurement precision that is adequate for ordinary applications. The use of such sensors thus incurs considerable costs. In addition, the mounting of a separate flow meter causes work at the mounting site, and the suitable mounting site and arrangement for the flow meter will often have to be planned separately each time. The mounting site conditions may also vary, and hence flow meters of different types will have to be used depending on the mounting site conditions. These factors increase the overall mounting and equipment cost.

BRIEF SUMMARY OF THE INVENTION

The purpose of the invention is to provide a new method and arrangement for measuring the flow in a pump system, the invention allowing the prior art drawbacks mentioned above to be eliminated or reduced.

The objectives of the invention are achieved with a solution, in which the flow value is determined without any direct flow measurement by utilising the pump characteristics together with variables whose measurement is easy and reliable. Such variables include i.a. the rotation speed of the pump, the liquid pressure and/or the motor power. Both the motor power and the rotation speed can be measured e.g. on the frequency converter. In fact, the invention is based on the idea of utilising the control unit data regarding the state of the alternating current motor, especially voltage and current data and frequency in the case of a three-phase current motor and a frequency converter. In addition, the static pressure of the liquid can be measured by means of a simple and reliable pressure sensor, which can be integrated in the pump system. Two characteristic curves of the pump can preferably be used in the implementation of the invention; flow as a function of power and flow as a function of pressure. This achieves high measurement precision both with low and with high flow values. Optionally one single selected characteristic curve can be used.

The invention yields appreciable benefits compared to prior art solutions:

flow measurement does not require any costly flow measurement sensor with a related measurement unit. It does not either require mounting of a separate measurement apparatus.

the solution of the invention allows integration of pressure sensors in the pump system both by mechanical and by electric means, thus avoiding external connections caused by flow measurement and associated risks of leakage, reliability etc.

another reason of the high reliability of the measurement of the invention is that the pressure sensors used are straightforward and thus durable and reliable. The solution of the invention can also be implemented without pressure sensors if the flow is determined merely on the basis of power. In other words, the solution of the invention does not require fragile flow sensors.

the measurement arrangement of the invention is independent of the mounting site conditions; there is no need for installation-specific measurements or other special arrangements.

the flow data are easy to utilise in the control of the pump system, because the flow information is generated in the control unit of the pump system.

The method of the invention for measuring flow in a pump system, in which a liquid flow is generated by a pump and the pump is actuated by an electric drive, and the speed rotation of an alternating current motor is controlled by a control unit, is characterised by the method comprising measuring the pump power in the pump system,
measuring the liquid pressure,
measuring the speed rotation of the pump,
determining a first estimate of the liquid flow on the basis of the measured pump power and rotation speed variables,
determining a second estimate of the liquid flow on the basis of the measured liquid pressure and rotation speed variables and
determining the flow measurement result by a logical selection or any other predetermined function on said first and second estimate.

The arrangement of the invention for measuring a flow in a pump system comprising a pump for generating a liquid flow, an electric drive for actuating the pump, the electric drive comprising an alternating-current motor and a control unit for controlling the rotation speed of the alternating current motor, is characterised by comprising means for measuring the pump power of the pump system,
means for measuring the liquid pressure,
means for measuring the rotation speed of the pump,
means for determining a first estimate of the liquid flow on the basis of the measured pump power and pump rotation speed variables,
means for determining a second estimate of the liquid flow on the basis of the measured liquid pressure and rotation speed variables and
means for determining the flow measurement result by a logical selection or any other predetermined function on said first and second estimate.

BRIEF DESCRIPTION OF THE DRAWING FIGURES

Figure 6:
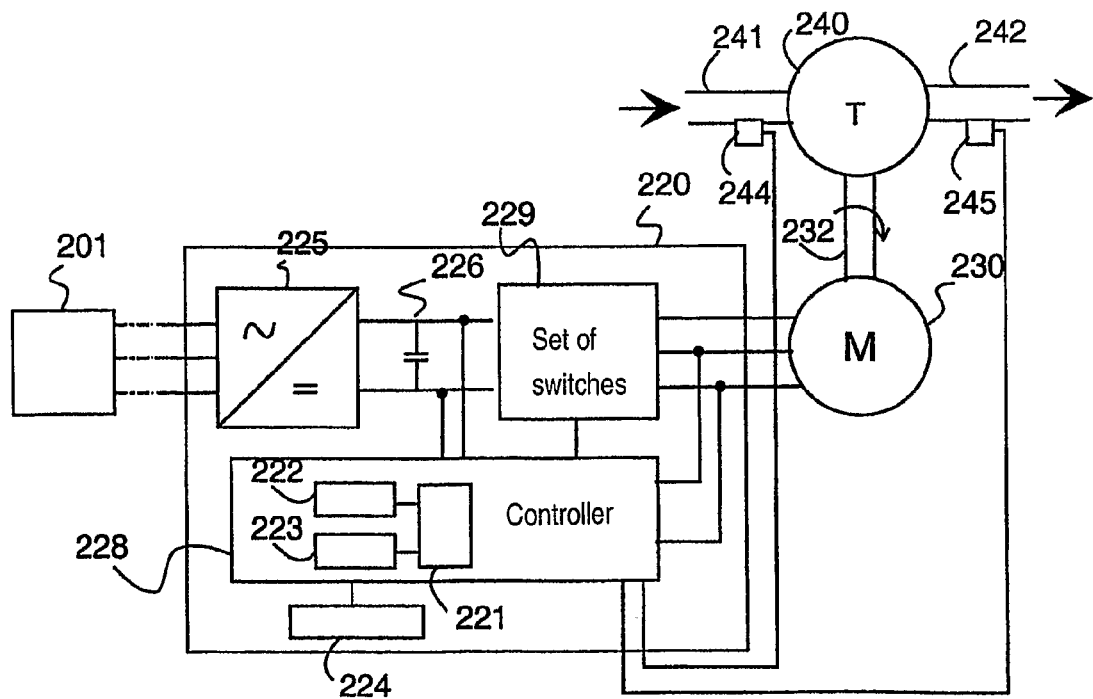
Figure 2:
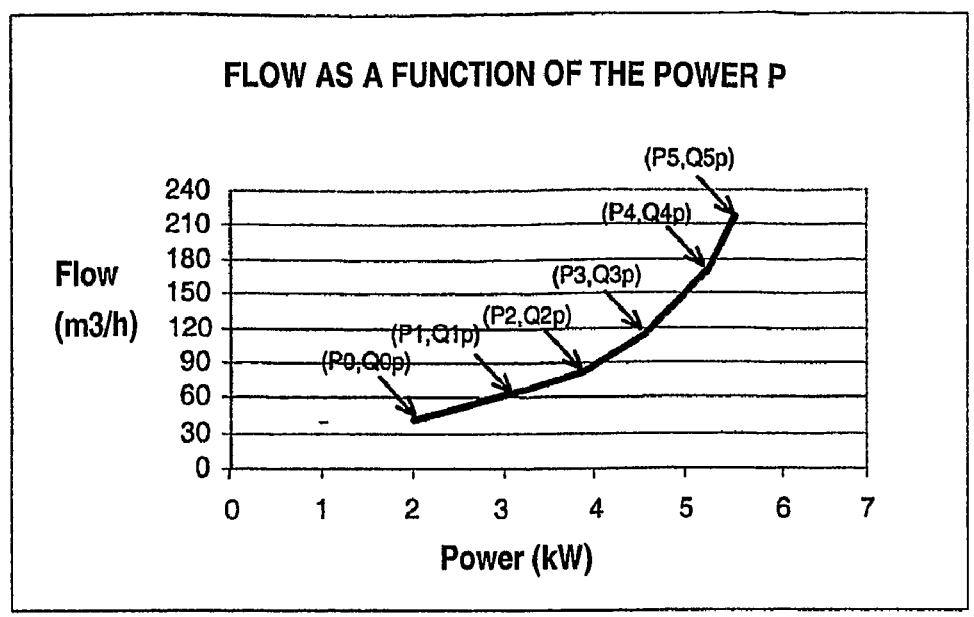
Figure 3:
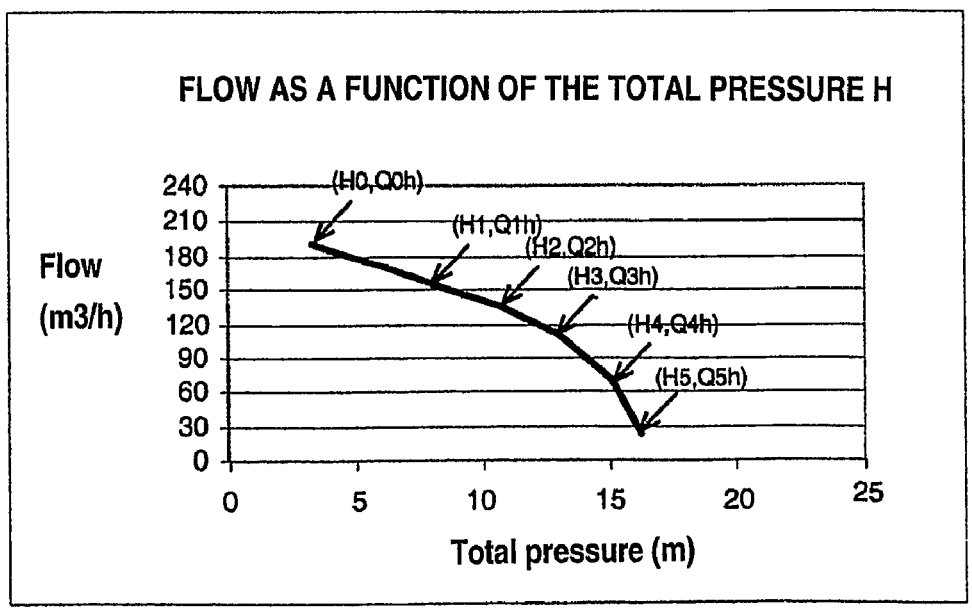
Figure 4:
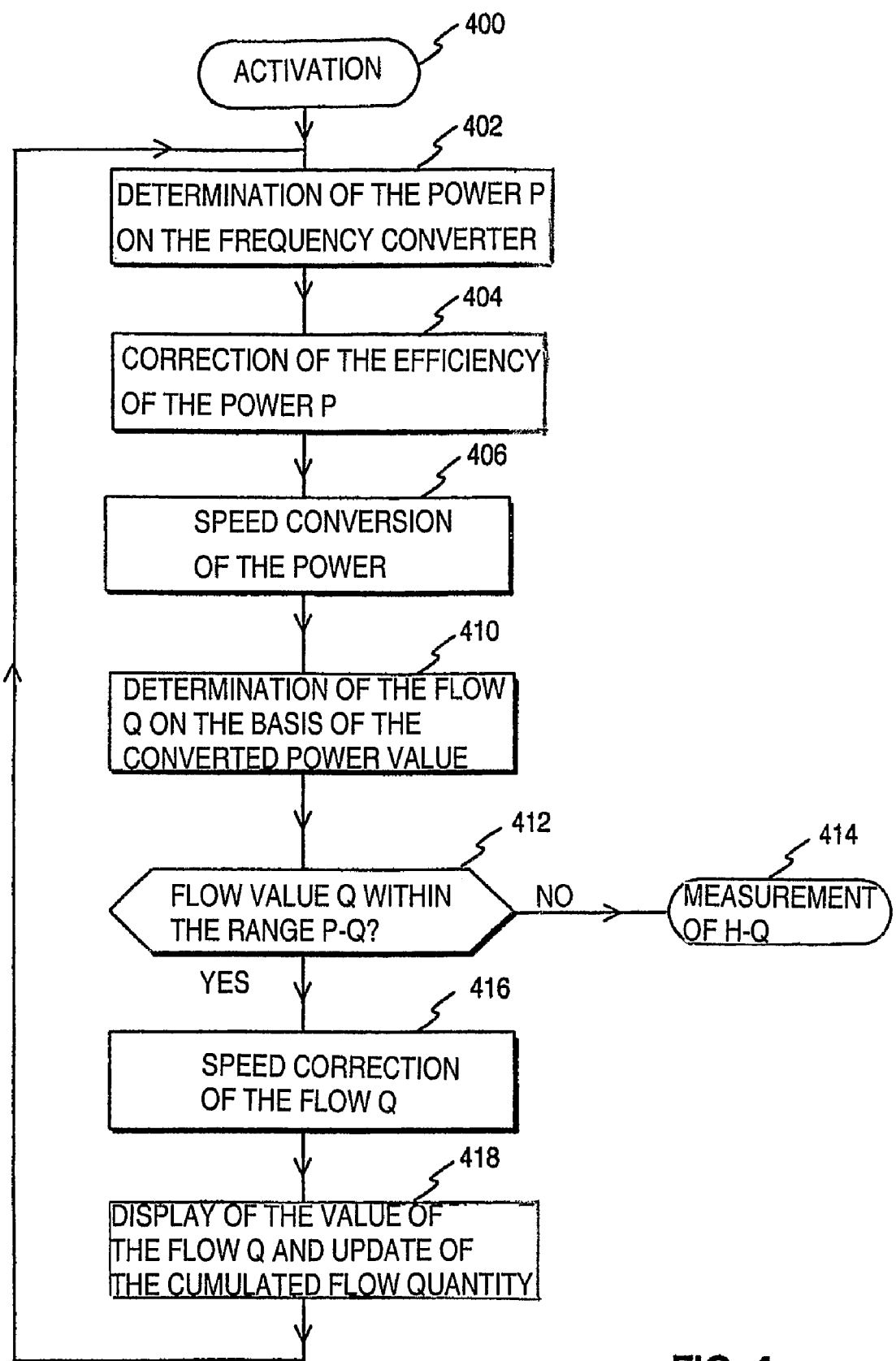
Figure 5:
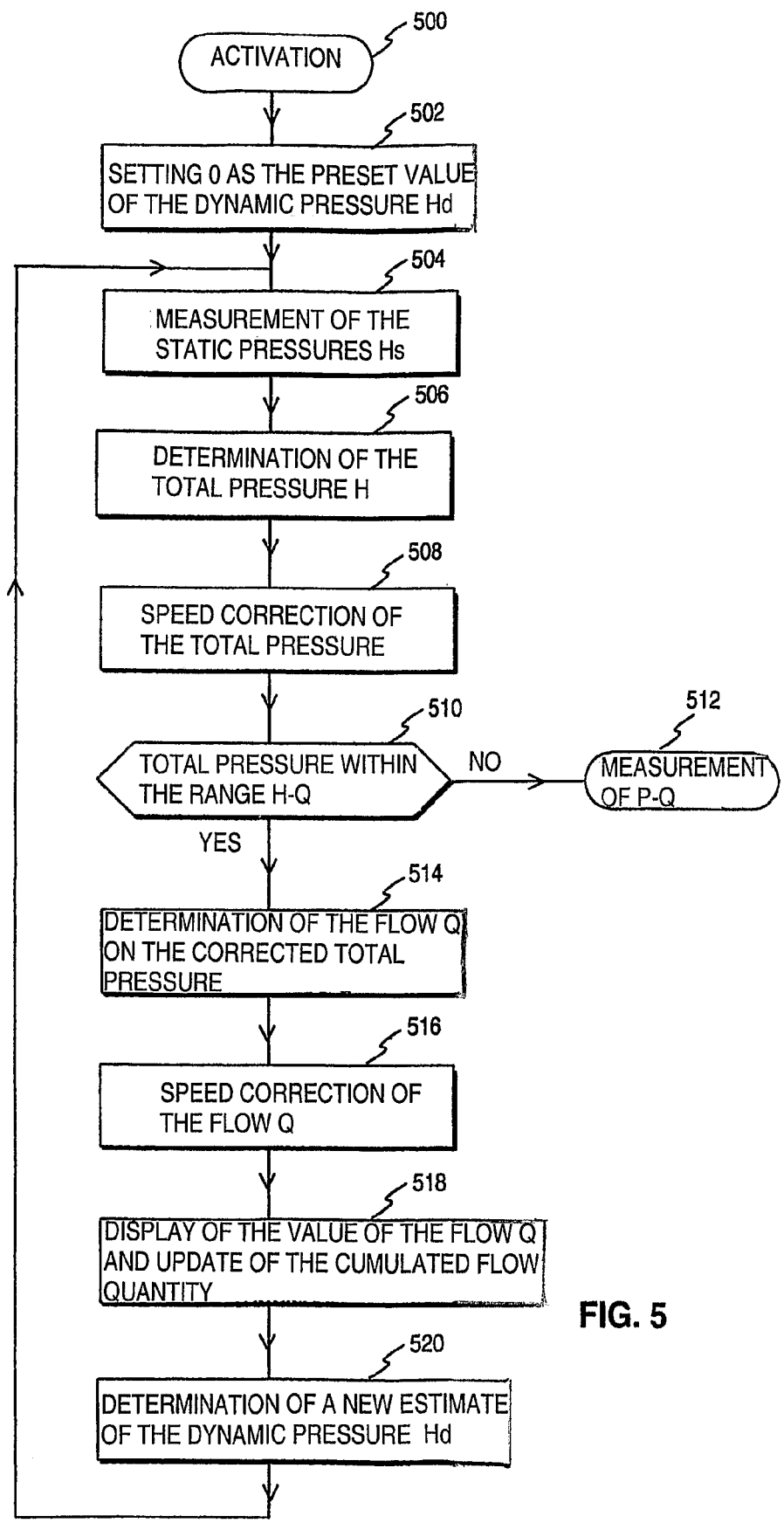

The invention and its other advantages are explained in greater detail below with reference to the accompanying drawings, in which FIG. 1 is a schematic view of the principle of a prior art pump system equipped with a frequency converter, FIG. 2 shows a power-flow characteristic constructed by measurements, which is usable in connection with the present invention, FIG. 3 shows a power-flow characteristic constructed by measurements, which is usable in connection with the present invention, FIG. 4 is a flow chart showing a method of the invention for determining the flow by the measured power, FIG. 5 is a flow chart showing a method of the invention for determining the flow by the measured total pressure and FIG. 6 is a block diagram of a pump arrangement of the invention.

DETAILED DESCRIPTION OF THE PREFERRED EMBODIMENTS

FIG. 1 has been explained above in the description of prior art.

FIG. 2 illustrates the flow Q as a function of power P when measured in a pump system. The characteristic has been formed by using six measurement points, i.e. parameter pairs (P0, Q0p), (P1, Q1p), (P2, Q2p), (P3, Q3p), (P4, Q4p), (P5, Q5p). Intermediate values have been linearly interpolated between these measurement points. In fact, it is preferable in the solution of the invention to store a relatively small set of parameter pairs and to form the value pair needed each time by interpolation calculation.

The characteristic shown in FIG. 2 has been formed for a specific predetermined nominal rotation speed of the motor/pump. If the real rotation speed differs from the nominal value, the power should first be converted so as to correspond to the nominal rotation speed, and the flow value obtained from the characteristic/table shall also be converted so as to correspond to the real rotation speed.

FIG. 3 illustrates the flow as a function of the total pressure when measured in a pump system. The characteristic has been formed using six measurement points, i.e. pairs of parameters: (H0, Q0h), (H1, Q1h), (H2, Q2h), (H3, Q3h), (H4, Q4h), (H5, Q5h). Intermediate values have been linearly interpolated between these measurement points. Accordingly, it is preferable in the solution of the invention to store a relatively small set of parameter pairs and to form the value pair needed each time by interpolation calculation. It should be noted that the variable characterising the pressure in this context is the delivery height H, which describes the water delivery height and is expressed in meters.

The characteristic in FIG. 3 has also been formed for a given predetermined nominal rotation speed of the motor/pump. If the real rotation speed differs from this nominal value, the pressure should first be converted so as to correspond to the nominal rotation speed and the flow value obtained from the characteristic should also be converted so as to correspond to the real rotation speed.

As can be seen in FIGS. 2 and 3, the power-flow curve yields the most accurate result with low flow values, the curve derivative being small. Similarly, the pressure-flow curve yields the most accurate result with high flow values, the curve derivative also having a low absolute value.

FIG. 4 is a flow chart of a method of the invention for determining the flow by a power P using a pump. Step 400 describes the activation of the pump system. Subsequently, in step 402, the value of the pump drive power P is measured, on the frequency converter in this case. The actuating performance P can be obtained from the frequency converter as a signal directly describing the power, or optionally signals describing the motor voltage and current are obtained from the frequency converter, these signals allowing calculation of the power. The value of the actuating performance P is multiplied with the motor efficiency coefficient in step 404.

Next, the power value obtained in step 406 is converted so as to correspond to the nominal rotation speed for which the power-flow table has been compiled and stored. The converted power $P_n$ is obtained as follows:

$$P_n = P_v * (v_n/v)^3 \qquad (2)$$

in which $P_v$ is the power measured with the real rotation speed, v is the real rotation speed and $v_n$ is the nominal rotation speed. The real rotation speed is most advantageously measured on the control unit, such as the frequency converter, by determining the frequency of the supply power to the alternating-current motor. Said speed measurement can be performed e.g. in step 402 or 406.

Subsequently, in step 410, the power value $P_n$ obtained above is adapted to the power-flow table, which is interpolated if necessary in order to obtain the correct value pair. The interpolation may be linear, being based on the two parameter pairs closest to the value searched in the table. The interpolation may optionally be based on a more complicated formula, taking account of several table points. In this manner, the flow value $Q_n$ corresponding to the nominal rotation speed is obtained from the table.

The following step 412 checks whether the flow value obtained is within the flow value range in which power-based flow definition is used. If the flow value is within this specific range, measurement proceeds to step 416. If the flow value is within a range using pressure-based definition, pressure-based measurement is adopted in step 414. Optionally, one could use one single method of determining the flow, or another option involves the use of two measurement methods in parallel (pressure and power) in each measurement, and then the result of the flow value is e.g. a predetermined mathematical function of the flow values obtained on the pressure and the power, such as the mean value.

In step 416 the flow value $Q_n$ obtained above is converted to a flow value $Q_v$ corresponding to the real rotation speed:

$$Q_v = Q_n * v/v_n \qquad (3)$$

The flow value thus obtained is shown on the display, step 418, and/or is transmitted via a data transmission channel to be processed somewhere else. In addition, momentary flow values are summed in the memory for determination of the cumulated flow quantity. The cumulated flow quantity is preferably stored in the memory, where they are safe in the event of power failure. If desired, it is also possible to make provisions for the cumulated flow data to be reset to zero.

FIG. 5 is a flow chart of a method of the invention for determining the flow by the pressure of a flowing liquid. Step 500 illustrates the activation of the pump system. The subsequent flow measurement is performed on the basis of the total pressure of the liquid. The total pressure H is obtained as follows:

$$H = H_s + H_d + \Delta h \qquad (4)$$

in which $H_s$ is the static pressure, which means the difference between the output pressure and the input pressure. $H_d$ is the dynamic pressure and $\Delta h$ is the difference of height between the static pressure sensors. The dynamic pressure $H_d$ is generated by liquid flow as follows:

$$H_d = V^2/2g \qquad (5)$$

in which V is the flow speed of the liquid and g is the gravitation acceleration. Since the liquid flow speed is not known in the first step, the first measurements after the activation (e.g. for 10 s) can use zero or any other pre-estimated constant value as the value of dynamic pressure, step 502.

The total pressure 506 calculated on the static input and output pressures is next converted in step 508 so as to correspond to the nominal rotation speed for which the pressure-flow table was compiled and stored. The converted pressure $H_n$ is obtained as follows:

$$H_n = H_v * (v_n/v)^2 \qquad (6)$$

in which $H_v$ is the total pressure measured with the real rotation speed, v is the real rotation speed and $v_n$ is the nominal rotation speed of the pump. The real rotation speed is most advantageously measured on the control unit, such as the frequency converter, by determining the frequency of the supply current to the alternating current motor. Said speed measurement is preferably also included in step 508.

The following step 510 comprises checking whether the measured pressure value obtained is within the pressure value range in which pressure-based flow determination is used. If the flow value is within this specific range, the measurement proceeds to step 514. If the pressure value is within a range where power-based determination is used, power-based measurement is adopted in step 512. Optionally, it is possible to use one single method of determining the flow, or another option is using two measurement methods (pressure and power) in parallel in each measurement.

In step 514, the pressure value $H_n$ obtained above is adapted to the pressure-flow table, which is interpolated if necessary in order to obtain the correct pair of values. The interpolation may be linear, being based on the two parameter pairs closest to the value searched in the table. The interpolation may optionally be based on a more complicated formula, taking account of several table points. In this manner, the flow value $Q_n$ corresponding to the nominal rotation speed is obtained from the table.

The flow value $Q_n$ obtained is converted in step 516 to a flow value $Q_v$ corresponding to the real rotation speed v:

$$Q_v = Q_n * v/v_n \qquad (7)$$

The flow value thus obtained in shown on the display, step 518, and/or is transmitted via a data transmission channel to be processed somewhere else. In addition, momentary flow values are summed in the memory e.g. once a minute for determination of the cumulated flow quantity. The cumulated flow quantity is preferably stored in the memory, where they are safe in the event of power failure. If desired, it is also possible to make provisions for the cumulated flow data to be zeroed.

The following step 520 comprises calculation of a new estimate value of the dynamic pressure by formula (5), with the flow speed V calculated first:

$$V = Q/(\pi*(D_{out}/2)^2) - (\pi*(D_{in}/2)^2) \qquad (8)$$

in which $D_{out}$ is the diameter of the output pipe and $D_{in}$ is the diameter of the input pipe.

After this, the measurement is repeated, the value of the dynamic pressure approaching its correct value after activation.

FIG. 6 is a block diagram of an arrangement of the invention for measuring the flow in a pump system. The system comprises an electric drive for actuating the pump 240, the electric drive consisting of an electric supply 201, a frequency converter 220 and an alternating-current motor 230. The frequency converter 220 shows a separate controller 228 for controlling the operation of the frequency converter and switches 229. The controller also performs calculation of flow values in accordance with the present invention. The controller receives signals describing the static pressure from pressure sensors 241 and 242 connected to the pump input and output. The controller further generates a motor input frequency signal, which describes the motor rotation speed, and a signal describing the motor power for calculation of the flow values. The generated momentary and cumulative flow value is shown on a display 224 connected to the controller. The controller may also have an interface for transferring the flow data to another device or to a data transmission channel.

An electric drive equipped with a frequency converter normally measures the supply current I and supply voltage U at different phases in an electric motor, and is performed in the control unit 228, which is given a control instruction in the form of a suitable electric signal from the outside of the electric drive, e.g. from the process measurement data, in the form of an appropriate speed instruction. Based on said current and voltages I, U, the power of the electric motor can be calculated e.g. in the controller 228 at each moment, and this can be used for calculating the flow in accordance with the present invention.

The control unit preferably comprises a processor 221, which performs calculation connected with flow determination and controls the operations of the control unit. The control unit also comprises a memory unit 222, in which the characteristic parameters of the pump and software controlling the processor are stored. The control unit also comprises a measurement unit 223, which receives and processes signals obtained from the pressure sensors and/or motor control. It should be noted that the example above uses parameter tables compiled on a given nominal value of the rotation speed, and then, before using the table, a speed conversion should be made of the power/pressure on the one hand and on the obtained flow value on the other hand. Another option would involve compiling tables for several rotation speeds, and then one would always use the table closest to the real rotation speed value. The table would then be three-dimensional and the input variables would comprise the rotation speed and the pressure/power and the output variable would comprise the flow.

It should be noted that one single measurement arrangement of the invention allows simultaneous analysis of the flow of one or more pump stations. The measurement can be integrated in the control unit of the electric drive proper, such as a frequency converter, or it can optionally be implemented as an arrangement external of one or more electric drives. In that case, the external measurement arrangement is preferably combined to the electric drive/drives over a suitable data transmission bus.

The invention has been explained above mainly by means of an electric drive comprising a frequency converter as the control unit. However, a person skilled in the art evidently applies the invention to other types of control units of electric drives as well. These control units have the essential feature of measurements of the power and/or frequency of the electric motor with a view to determination of the liquid flow, the measurement signals being specifically utilised in the invention.

The invention is not limited merely to the embodiment example given above, many variants being possible without departing from the scope of the inventive idea defined in the independent claims.

The invention claimed is:

1. A method for measuring a flow in a pump system, in which a liquid flow is generated by means of a pump and the pump is actuated by an electric drive, in which the rotation speed of an alternating-current motor is controlled with a control unit, comprising:
   measuring (402) a pump power (P) in the pump system,
   measuring a rotation speed (v) of the pump,
   measuring (504) a static pressure ($H_s$),
   setting an estimate of a dynamic pressure ($H_d$) to a pre-estimated constant value,
   determining (506) an estimate of a total pressure (H) on the basis of the static pressure, a difference ($\Delta h$) of height between static pressure sensors, and the estimate of the dynamic pressure,
   determining a first estimate (410, 416) of the liquid flow on the basis of the measured pump power (P) and rotation speed variables,
   determining a second estimate (514, 516) of the liquid flow on the basis of the estimate of a total pressure (H) and rotation speed variables,
   determining a flow measurement result by a logical selection or any other predetermined function on said first estimate of the liquid flow and said second estimate of the liquid flow,
   determining (520) a new estimate of a dynamic pressure ($H_d$) on the basis of the flow measurement result,
   re-determining the estimate of a total pressure (H) on the basis of the static pressure, the difference ($\Delta h$) of height between the static pressure sensors, and the new estimate of the dynamic pressure,
   re-determining the second estimate of the liquid flow on the basis of the estimate of a total pressure (H) and rotation speed variables, and
   re-determining the flow measurement result by a logical selection or any other predetermined function on said first estimate of the liquid flow and said second estimate of the liquid flow.

2. The method as defined in claim 1, further comprising: determining a first flow value range and a second flow value range, said first estimate of the liquid flow being selected as the flow measurement result if said first estimate of the liquid flow is within the first flow value range (412), and said second estimate of the liquid flow being selected as the flow measurement result if said second estimate of the liquid flow is within the second flow value range (510).

3. The method as defined in claim 2, wherein said first flow value range and said second flow value range are selected such that, in the first flow value range an absolute value of a sensitivity of flow change versus relative power change is lower than an absolute value of a sensitivity of flow change versus relative total pressure change, and in that in the second flow value range, said absolute value of said sensitivity of flow change versus relative total pressure change is lower than said absolute value of said sensitivity of flow change versus relative power change.

4. The method as defined in claim 1, wherein the flow measurement result is determined on the basis of both the total pressure and the pump power, the flow measurement result being a predetermined mathematical function of said first estimate of the liquid flow and said second estimate of the liquid flow.

5. The method as defined in claim 4, wherein said predetermined mathematical function is a mean value.

6. The method as defined in claim 1, wherein the frequency of the current supplied to the alternating-current motor is measured and the rotation speed of the motor is determined on the basis of the measured supply frequency.

7. The method as defined in claim 1, wherein the supply current and supply voltage of the alternating-current motor is measured and the power (P) of the alternating-current motor is determined on the basis of the measured current value (I) and voltage value (U).

8. The method as defined in claim 1, wherein, with a view to determining the static pressure ($H_s$), a first static pressure value of the liquid prevailing in the pump input is measured and a second static pressure value of the liquid prevailing in the pump output is measured, and said static pressure is formed by determining the difference between the second static pressure value and the first static pressure value.

9. The method as defined in claim 8, wherein, with a view to determining the estimate of the total pressure (H), said estimate of the total pressure is formed by adding the estimate of the dynamic pressure to the static pressure.

10. The method as defined in claim 1, wherein the calculation of the flow value is performed in the control unit and that the control unit is a frequency converter.

11. An arrangement for measuring the flow in a pump system comprising a pump (240) for generating a liquid flow, an electric drive for actuating the pump, the electric drive comprising an alternating-current motor (230) and a control unit (220) for controlling the rotation speed of the alternating-current motor, comprising:
  means (221, 223) for measuring a pump power (P) in the pump system,
  means (221, 223, 228) for measuring a rotation speed (v) of the pump,
  means (244, 245) for measuring a static pressure ($H_s$),
  means (221, 222, 228) for setting an estimate of a dynamic pressure ($H_d$) to a pre-estimated constant value,
  means (221, 222, 228) for determining an estimate of a total pressure (H) on the basis of the static pressure, a difference (Δh) of height between static pressure sensors, and the estimate of the dynamic pressure,
  means (221, 222) for determining a first estimate of the liquid flow on the basis of the measured pump power (P) and rotation speed variables,
  means (221, 222) for determining a second estimate of the liquid flow on the basis of the estimate of a total pressure (H) and rotation speed variables,
  means (221, 222) for determining a flow measurement result by a logical selection or any other predetermined function on said first estimate of the liquid flow and said second estimate of the liquid flow,
  means (221, 222) for determining a new estimate of a dynamic pressure ($H_d$) on the basis of the flow measurement result,
  means (221, 222) for re-determining the estimate of a total pressure (H) on the basis of the static pressure, the difference (Δh) of height between the static pressure sensors, and the new estimate of the dynamic pressure,
  means (221, 222) for re-determining the second estimate of the liquid flow on the basis of the estimate of a total pressure (H) and rotation speed variables, and
  means (221, 222) for re-determining the flow measurement result by a logical selection or any other predetermined function on said first estimate of the liquid flow and said second estimate of the liquid flow.

12. The measurement arrangement as defined in claim 11, wherein the arrangement comprises means (222) for storing a first flow value range and a second flow value range, means (221) for selecting said first estimate of the liquid flow as the flow measurement result if said first estimate of the liquid flow is within the first flow value range, and means (221) for selecting said second estimate of the liquid flow as the flow measurement result if said second estimate of the liquid flow is within the second flow value range.

13. The measurement arrangement as defined in claim 12, wherein the arrangement comprises means (221) for selecting said first flow value range and said second flow value range such that, in the first flow value range an absolute value of a sensitivity of flow change versus relative power change is lower than an absolute value of a sensitivity of flow change versus relative total pressure change, and in that in the second flow value range, the absolute value of the sensitivity of flow change versus relative total pressure change is lower than the absolute value of the sensitivity of flow change versus relative power change.

14. The measurement arrangement as defined in claim 11, wherein the arrangement comprises means (221, 222) for determining the flow measurement result on the basis of both the total pressure and the pump power, the flow measurement result being a predetermined mathematical function of said first estimate of the liquid flow and said second estimate of the liquid flow.

15. The measurement arrangement as defined in claim 14, wherein said predetermined mathematical function is a mean value.

16. The measurement arrangement as defined in claim 11, wherein the control unit (220) comprises means (223, 228) for measuring the frequency of the current supplying the alternating-current motor and means (221, 222) for determining the rotation speed of the motor on the basis of the measured supply frequency.

17. The measurement arrangement as defined in claim 11, wherein the control unit (220) comprises means (221, 223, 228) for measuring the supply current and supply voltage of the alternating-current motor and means (221, 222) for determining the power (P) of the alternating-current motor on the basis of the measured current value (I) and voltage value (U).

18. The measurement arrangement as defined in claim 11, wherein the arrangement comprises a first pressure sensor (244) for measuring a first static pressure value prevailing in the pump input, a second pressure sensor (245) for measuring a second static pressure value prevailing in the pump output, and means (221, 223) determining said static pressure ($H_s$) to be a difference between the second static pressure value and the first static pressure value.

19. The measurement arrangement as defined in claim 18, wherein the arrangement comprises means (221) for forming the estimate of the total pressure (H) as a sum of the static pressure and the estimate of the dynamic pressure.

20. The measurement arrangement as defined in claim 11, wherein the means (221, 222, 223, 228) for calculating the flow measurement result are included in the control unit (220), the control unit being a frequency converter.

21. The measurement arrangement as defined in claim 20, wherein the control unit (220) comprises a processor (221) for controlling the operation of the control unit, said processor being disposed to perform calculation of the flow measurement result.

22. The measurement arrangement as defined in claim 20, wherein the control unit (220) comprises at least one of the following: a display (224) for displaying the flow measurement result and means for transmitting the flow measurement result to a data transmission channel.

23. The measurement arrangement as defined in claim 20, wherein the control unit is disposed to use the flow measurement result as a control parameter of the electric drive.

* * * * *